US012536364B1

(12) United States Patent
Hung et al.

(10) Patent No.: US 12,536,364 B1
(45) Date of Patent: Jan. 27, 2026

(54) FANOUT-BASED COMBINATIONAL LOOP EMULATION

(71) Applicant: Cadence Design Systems, Inc., San Jose, CA (US)

(72) Inventors: Ngai Ngai William Hung, San Jose, CA (US); Platon Beletsky, San Jose, CA (US); Dongxiang Wu, Palo Alto, CA (US); Dhiraj Goswami, Wilsonville, OR (US)

(73) Assignee: Cadence Design Systems, Inc., San Jose, CA (US)

( * ) Notice: Subject to any disclaimer, the term of this patent is extended or adjusted under 35 U.S.C. 154(b) by 583 days.

(21) Appl. No.: 18/096,445

(22) Filed: Jan. 12, 2023

(51) Int. Cl.
*G06F 30/398* (2020.01)

(52) U.S. Cl.
CPC .................. *G06F 30/398* (2020.01)

(58) Field of Classification Search
CPC ...................................... G06F 30/398
USPC ....................................... 716/132
See application file for complete search history.

(56) References Cited

U.S. PATENT DOCUMENTS

| 10,783,305 | B1 * | 9/2020 | Fonseca | G06F 30/3323 |
| 2009/0083685 | A1 * | 3/2009 | Gidon | G06F 30/327 716/113 |
| 2023/0351085 | A1 * | 11/2023 | Raghavan | G06F 30/331 |

* cited by examiner

*Primary Examiner* — Suchin Parihar
(74) *Attorney, Agent, or Firm* — Schwegman Lundberg & Woessner, P.A.

(57) ABSTRACT

Methods and systems are provided for performing combinational loop emulation. The methods and systems access a circuit design comprising a loop break element in a combinational loop path, where the loop break element comprises an input and an output. The methods and systems detect a change between the input of the loop break element and the output of the loop break element. The methods and systems identify a type of consumer of the output of the loop break element in the combinational loop path. The methods and systems determine whether to apply an extra clock cycle to the loop break element based on the type of consumer of the output of the loop break element and the detected change between the input and the output of the loop break element.

20 Claims, 8 Drawing Sheets

FANOUT-BASED COMBINATIONAL LOOP EMULATION

TECHNICAL FIELD

The present disclosure generally relates to the technical field of circuit design. In particular, the present disclosure addresses systems and methods for emulating combinational loops of circuit designs.

BACKGROUND

An integrated circuit (IC) layout specifies portions of various components of an IC. An IC typically includes a large number of registers, latches, flip-flops and/or other types of clocked devices, which are referred to herein generally as "clock sinks," ("sinks"). Certain IC layouts include combinational loop paths where the output of one or more combinational logic elements is fed back to the input of the one or more combinational logic elements. Emulating the operation of such IC layouts presents many challenges.

BRIEF DESCRIPTION OF THE DRAWINGS

To easily identify the discussion of any particular element or act, the most significant digit or digits in a reference number refer to the figure number in which that element is first introduced.

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Certain IC layouts include combinational loop paths where the output of a set of combinational logic elements is fed back to the input of the set of combinational logic elements. These combinational loop paths in IC layouts are typically emulated or simulated in many different ways. One way to emulate the behavior of combinational loop paths involves a processor-based emulation system, which simulates the circuit design using processor instructions. In these systems, if there is a combinational loop in the circuit design, the signals passing the loop may need to be evaluated multiple times in order to converge at a steady state. Evaluating such designs using the processor-based emulation system presents challenges as making such systems run in loops causes the systems to become general-purpose processors. The performance of a system clock (hereafter, referred to as fclk) used to operate the IC layout can become unstable and unpredictable in these approaches.

To address these issues, certain conventional processor-based emulation systems break the combinational loops by injecting loop breakers (or loop break elements), which are essentially flip-flops running on the fclk. The loop breakers can be inserted between the output of the combinational elements of the combinational path and another instance of the same combinational elements. Generally, such approaches allow the processor-based emulation system to emulate the combinational paths accurately. However, if the output of the loop breaker changes value, the loop breaker needs one additional fclk cycle to ensure that the correct value is fed back into the other instance of the combinational elements on time. Otherwise, the combinational path may be broken and provide incorrect results. One way to have the loop breaker output the correct value in time is by doubling the frequency of the fclk applied to the loop breaker relative to the fclk that is applied to the rest of the circuit. This typically works out. In certain cases, there may exist multiple loop breakers in the same combinational loop path which means that the final loop breaker in the path needs to receive the updated values from the first loop breaker in the path before the next clock cycle of the fclk that is applied to the rest of the circuit. In such instances, the fclk that is applied to the loop breakers may need to be operated at 8×, 16×, and so forth relative to the frequency applied to the rest of the circuit (e.g., the user design clock). This can, in very large designs, be very unstable and cause erratic behavior.

One approach to address these issues involves statically analyzing the circuit and positioning the loop breakers to prevent having two or more loop breakers on the combinational paths. This can ensure that the fclk applied to the loop breakers is operated at no more than 4×. However, certain designs can have billions of latches, and these latches have very complicated clock cones, so they all show up as potentially combinationally connected to each other, leading to gigantic strongly connected components (SCC) with many millions of gates involved. Statically analyzing such scenarios can exponentially increase the compile time, which is incredibly inefficient and time-consuming, making such compilations impractical to implement and use. Ideally, the approach would be to remove loop breakers or reducing their presence altogether. In static timing analysis (STA), regardless of the emulator being FPGA-based or processor-based, the STA will have various complexity to handle combinational loops.

Embodiments of the present disclosure are directed to EDA software systems that implement techniques for selectively and intelligently managing loop breakers or loop break elements in IC design and layout emulations. The disclosed techniques analyze the inputs and outputs of loop break elements and determine or identify a type of consumer of the output of the loop break elements to selectively add extra clock cycles (e.g., to selectively apply a faster fclk) to the loop break elements. Particularly, if the input and output of the loop break elements are determined to be different, this can indicate a change in state of the combinational loop that needs to be propagated. Rather than blindly applying a faster clock to the loop break element to handle the propagation of the change in state, the disclosed techniques determine whether the change in state is being consumed by an element that runs on the fclk or itself is combinatorial. On that additional basis, the disclosed techniques increase the rate of the fclk applied to the loop breaker to propagate the change in state within the clock cycle of the fclk applied to the rest of the circuit (e.g., the consumer).

For example, if the consumer is a latch that is enabled using a latch-enable signal, the change in state may need to be propagated within the fclk cycle. In such cases, an additional clock cycle is applied to the loop break element within the fclk cycle to propagate the change in state to the latch. As another example, if the consumer is a flip flop element that operates on a falling edge of the fclk, the change in state can be propagated at the same time as the rising edge of the fclk cycle. In such cases, an additional clock cycle is not applied to the loop break element and the fclk continues to be applied to the loop breaker. In some cases, if the consumer is a flip flop, the loop breaker can be bypassed and the input of the loop breaker can be routed through a set of logic elements directly to the flip flop to avoid having to insert an extra clock cycle to the loop breaker.

In some examples, the techniques described access, from memory, a circuit design including a loop break element in a combinational loop path, the loop break element including an input and an output. The disclosed techniques detect a change between the input of the loop break element and the output of the loop break element and identify a type of consumer of the output of the loop break element in the combinational loop path. The disclosed techniques determine whether to apply an extra clock cycle to the loop break element based on the type of consumer of the output of the loop break element and the detected change between the input and the output of the loop break element. In some examples, the disclosed techniques generate the extra clock cycle in response to determining whether to apply the extra clock cycle to the loop break element.

In some examples, the loop break element includes a flip flop. In some examples, the disclosed techniques, in response to detecting the change between the input and the output of the loop break element and in response to determining that the type of consumer includes a first type (e.g., an asynchronous logic element), increase a clock frequency of a clock that is applied to the loop break element to generate the extra clock cycle. In some examples, the disclosed techniques, in response to detecting the change between the input and the output of the loop break element and in response to determining that the type of consumer includes a second type (e.g., a synchronous logic element), maintain a clock frequency of a clock that is applied to the loop break element to prevent application of the extra clock cycle.

In some examples, the disclosed techniques identify one or more circuit elements between the loop break element and the consumer and, in response to determining that the type of consumer includes a flip flop, duplicate the one or more circuit elements and bypass the loop break element to route the input of the loop break element to the consumer via the duplicated one or more circuit element. In some examples, the disclosed techniques apply the input and the output of the loop break element to an XOR gate. The disclosed techniques apply an output of the XOR gate to a first input of an AND gate and apply a signal associated with the consumer of the output of the loop break element to a second input of the AND gate. In some examples, the disclosed techniques trigger application of the extra clock cycle to the loop break element based on an output of the AND gate.

In some examples, the consumer type includes a latch and the signal associated with the consumer includes a latch enable signal. In some examples, the consumer type includes a memory write element and the signal associated with the consumer includes a write enable signal. In some examples, the type of consumer includes at least one of a latch, a flip flop, a memory write element, or a memory read element.

In some examples, the loop break element is a first loop break element and the combinational loop path is a first combinational loop path. In such cases, the disclosed techniques identify a second loop break element in a second combinational loop path of the circuit design, the second loop break element including an input and an output. The disclosed techniques detect a change between the input of the second loop break element and the output of the second loop break element and identify a type of consumer of the output of the second loop break element in the second combinational loop path. The disclosed techniques determine whether to apply an extra clock cycle to the first and second loop break elements based on a first condition including the type of consumer of the output of the first loop break element and the detected change between the input and the output of the first loop break element, and a second condition including the type of consumer of the output of the second loop break element and the detected change between the input and the output of the second loop break element. In some examples, the extra clock cycle is applied to both the first and second loop break elements in response to either of the first or second conditions being satisfied.

In some examples, the disclosed techniques apply the input and the output of the first loop break element to a first XOR gate and apply an output of the first XOR gate to a first input of a first AND gate. The disclosed techniques apply a signal associated with the consumer of the output of the first loop break element to a second input of the first AND gate and apply the input and the output of the second loop break element to a second XOR gate. The disclosed techniques apply an output of the second XOR gate to a first input of a second AND gate and apply a signal associated with the consumer of the output of the second loop break element to a second input of the second AND gate. The disclosed techniques apply outputs of the first and second AND gates to an OR gate. In some examples, the disclosed techniques trigger application of the extra clock cycle to the first and second loop break elements based on an output of the OR gate.

Reference will now be made in detail to specific example embodiments for carrying out the disclosed subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Figure 1:
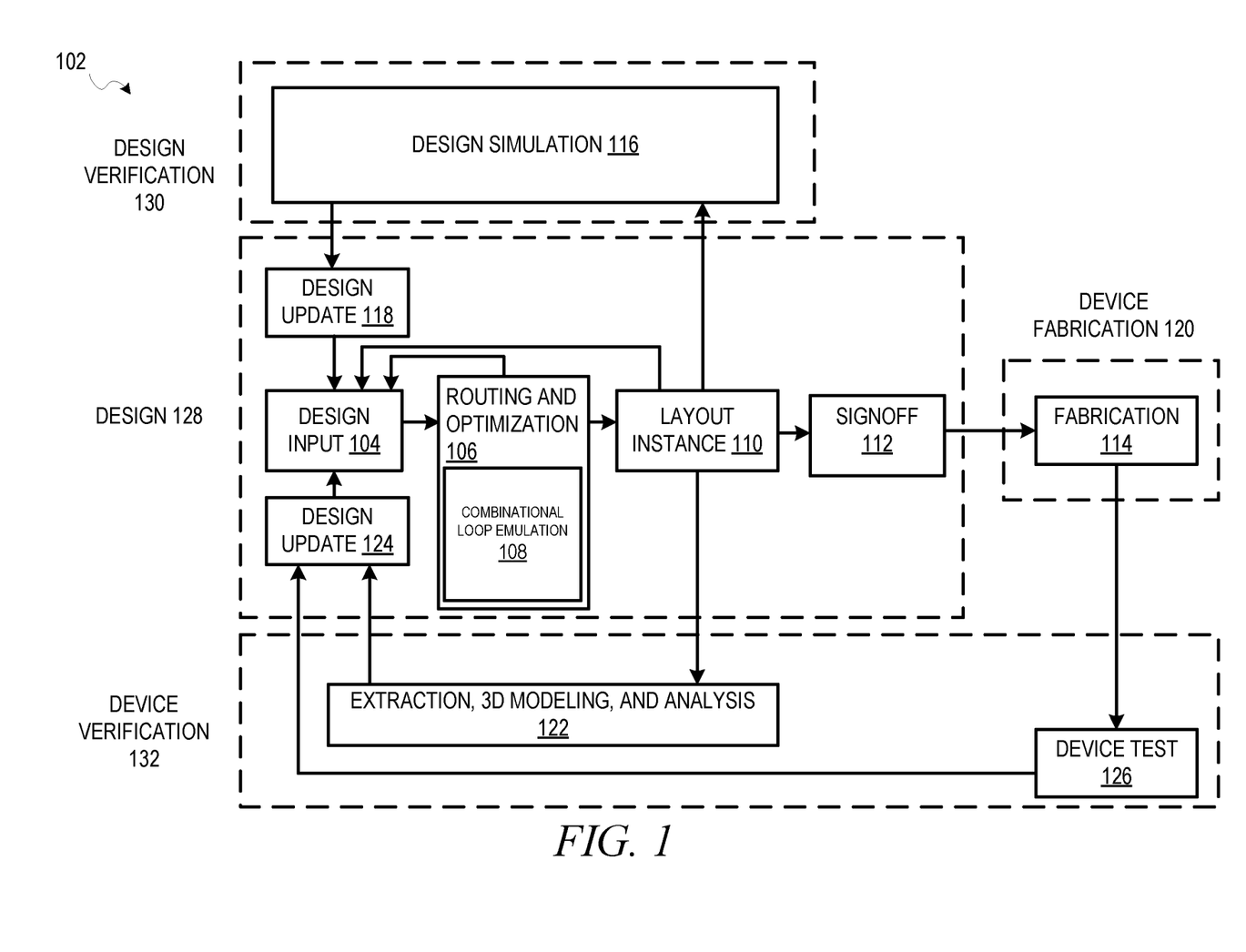
FIG. 1 illustrates an example design process flow that includes combinational loop emulation, in accordance with some embodiments of the present disclosure.

FIG. 1 is a diagram illustrating an example design process flow 102 of an EDA software system that includes combinational loop emulation in accordance with some embodiments. As shown in FIG. 1, the design process flow 102 includes a design phase 128, a device fabrication phase 120, a design verification phase 130, and a device verification phase 132. The design phase 128 involves an initial design input operation 104 where basic elements and functionality of a device, typically an IC, are determined. The initial design input operation 104 may also include revisions to elements or functionality of the device based on various analyses and optimization of a circuit design to be include in the device. This initial design input operation 104 operation is where block instances are used in the circuit design and any additional circuitry for the circuit design around the blocks is selected. The initial strategy, tactics, and context for the device to be created are also generated in the initial design input operation 104, depending on the particular design algorithm being used. In some cases, the initial design input operation 104 involves detection of combinational loops in the circuit design and the insertion of loop breakers (e.g., loop break elements, such as flip-flop elements) in the combinational loops.

In some embodiments, following an initial selection of design values in the design input operation 104, routing, timing analysis, and optimization are performed in a routing and optimization operation 106, along with any other automated design processes. While the design process flow 102 shows the routing and optimization operation 106 occurring prior to a layout instance operation 110, routing, timing analysis, and optimization in operation 106 may be performed at any time to verify operation of a circuit design. For instance, in various embodiments, timing analysis in a circuit design may be performed prior to routing of connections in the circuit design, after routing, during register transfer level (RTL) operations, or as part of a signoff operation 112, as will be understood by those skilled in the art.

In FIG. 1, the routing and optimization operation 106 includes a combinational loop emulation operation 108, which may be performed in accordance with various embodiments described herein. The combinational loop emulation operation 108 detects the insertion of loop breakers in the circuit design and adds combinational logic for selectively controlling the addition of extra clock cycles (e.g., one or more clock cycles) to the loop breakers. As referred to herein, the addition of extra clock cycles includes applying a faster clock relative to the fclk (the clock used to operate the user design). The faster clock can operate at a rate of 2×, 4×, 8×, 16×, and so forth relative to the fclk. The combinational loop emulation operation 108 can be included in any other component illustrated in FIG. 1 in the alternative or additionally.

In FIG. 1, after design inputs are used in the design input operation 104 to generate a circuit layout for the functional circuitry of the device being designed, and the routing and optimization operation 106 is performed, a layout is generated in the layout instance operation 110. The layout describes the physical layout dimensions of the device that match the design inputs. Prior to this layout being provided to a fabrication operation 114, the signoff operation 112 is performed on the circuit design defined by the layout.

After signoff verification by the signoff operation 112, a verified version of the layout is used in the fabrication operation 114 to generate a device, or additional testing and design updates may be performed using designer inputs or automated updates based on design simulation operations 116, or extraction, 3D modeling, and analysis operations 122. Once the device is generated, the device can be tested as part of device test operation 126, and layout modifications generated based on actual device performance.

A design update operation 118 from the design simulation operation 116, a design update operation 124 from the device test operation 126 or the extraction, 3D modeling, and analysis operations 122, or the design input operation 104 may occur after the initial layout instance operation 110 is performed. In various embodiments, whenever design inputs are used to update or change an aspect of a circuit design, a timing analysis and the routing and optimization operation 106 may be performed.

Figure 2:
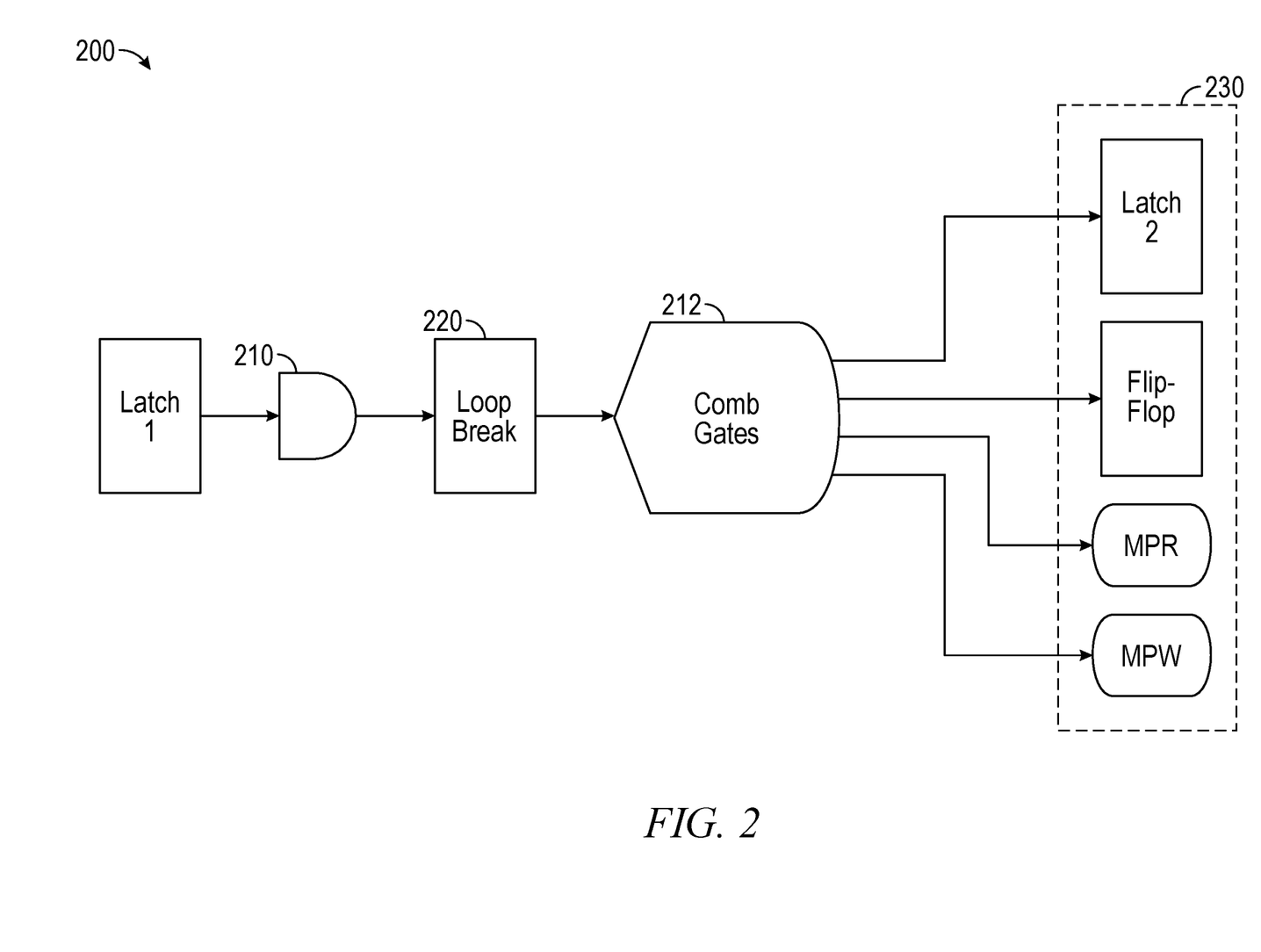
FIG. 2 illustrates examples of consumers of combinational loop paths, in accordance with some embodiments of the present disclosure.

FIG. 2 illustrates examples 200 of consumers of combinational loop paths, in accordance with some embodiments of the present disclosure. Particularly, the examples 200 shown in FIG. 2 may be processed by the combinational loop emulation operation 108. In some cases, the combinational loop emulation operation 108 detects a first combinational element 210 and a second combinational element 212 (or multiple combinational elements) in a combinational loop path. The combinational loop path can be modified by the combinational loop emulation operation 108 and/or another component of the design process flow 102 to add a loop break element 220. The loop break element 220 can be implemented by one or more flip-flop elements that run on the fclk used to operate the other elements, such as first combinational element 210 and second combinational element 212. In some cases, the loop break element 220 is operated and runs on a multiple of the fclk (e.g., 2×, 4×, 8×, 16× speed corresponding to two times the frequency of the fclk, 4 times the frequency of the fclk, and so forth). This ensures that the signal received by the loop break element 220 is propagated to the second combinational element 212 within the same cycle as the fclk.

The signals processed by the second combinational element 212 are then provided to one or more consumers 230. The one or more consumers 230 can include any one or combination of latches, flip-flops (operating on a rising edge or falling edge of the fclk), memory read elements (MPR), and/or memory write elements (MPW). In order to avoid having to always run the loop break element 220 at a faster clock than the fclk (e.g., 2× the fclk), the combinational loop emulation operation 108 can add logic that selectively increases the clock that is applied to the loop break element 220. The logic can consider not only whether a change in state is present or detected between an input and an output of the loop break element 220 but also what type of consumer of the one or more consumers 230 is coupled to receive the output of the loop break element 220.

Figure 3A:
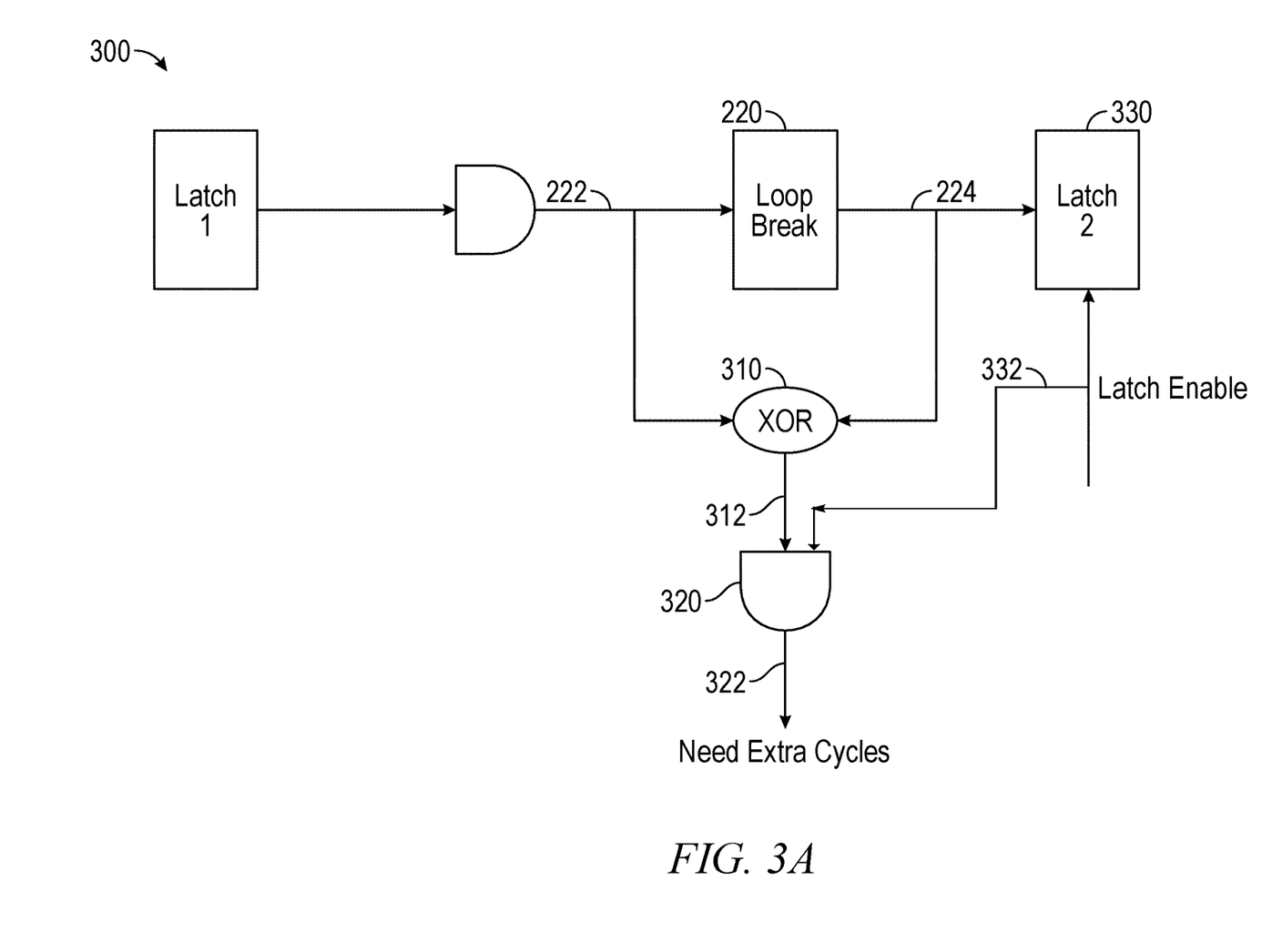
FIGS. 3A, 3B, and 4 illustrate examples of different types of consumers of a combinational loop path, in accordance with some embodiments of the present disclosure.
Figure 3B:
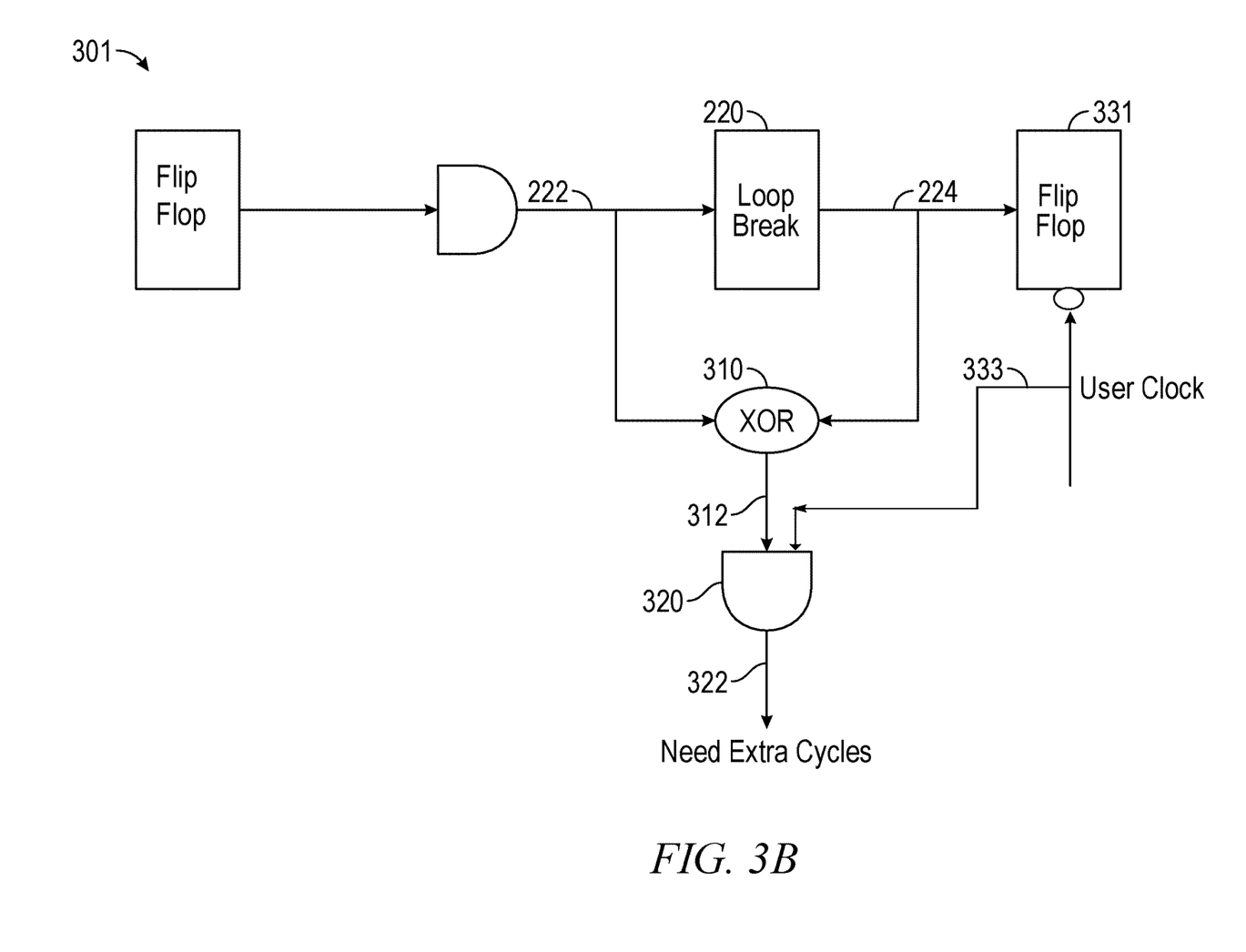
Figure 4:
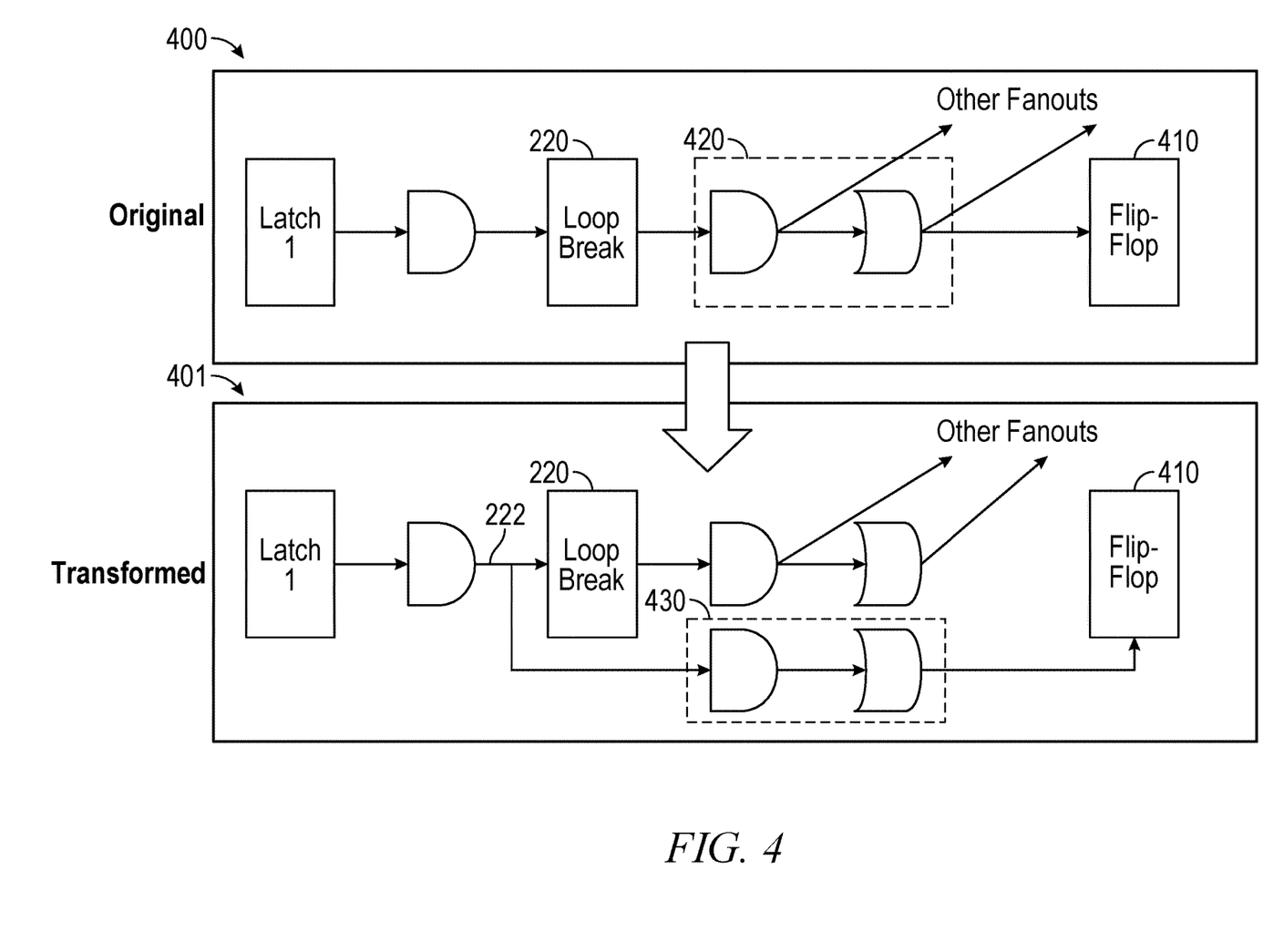

FIGS. 3A, 3B, and 4 illustrate examples of different types of consumers of a combinational loop path, in accordance with some embodiments of the present disclosure. For example, as shown in example 300 of FIG. 3A, the consumer type that receives the output of the loop break element 220 is a latch 330. In such cases, the combinational loop emulation operation 108 can add logic elements including an XOR gate 310 and an AND (or NAND) gate 320 to selectively control the clock frequency and whether extra clock cycles are applied to the loop break element 220 before the signal is propagated and processed by the latch 330. Particularly, in the case that the consumer type is the latch 330, the combinational loop emulation operation 108 can cause the loop break element 220 to be operated at a faster clock when or in response to detecting a change in state between the input 222 to the loop break element 220 and the output 224 of the loop break element 220.

In some examples, the XOR gate 310 receives at its inputs the input 222 to the loop break element 220 and the output 224 of the loop break element 220. The XOR gate 310 is configured to detect a change in state between the input and output of the combinational loop path, such as the loop break element 220. The output 312 of the XOR gate 310 is provided to a first input of the AND gate 320. In addition, the AND gate 320 receives at a second input a signal representing the consumer type of the output 224. In this case, the second input of the AND gate 320 receives the latch enable signal 332 indicating that the consumer type is the latch 330. In this way, whenever a state change is detected by the XOR gate 310 (e.g., the input 222 differs in value from the output 224) and the latch enable signal 332 is in the enabled state causing the latch 330 to latch or lock the current value, the combinational loop emulation operation 108 doubles or otherwise increases the rate of the clock applied to the loop break element 220. In such cases, the clock applied to the loop break element 220 is faster relative to the rate of the clock applied to other circuit elements to add at least one extra clock cycle to the loop break element 220 before a rising or falling edge of the fclk is applied to the other circuit elements.

As another example, the consumer type that receives the output of the loop break element 220 can be a memory write element. In such cases, the combinational loop emulation operation 108 can add logic elements including an XOR gate 310 and an AND (or NAND) gate 320 to selectively control the clock frequency and whether extra clock cycles are applied to the loop break element 220 before the signal is propagated and processed by the memory write element. Particularly, in the case that the consumer type is the memory write element, the combinational loop emulation operation 108 can cause the loop break element 220 to be operated at a faster clock when or in response to detecting a change in state between the input 222 to the loop break element 220 and the output 224 of the loop break element 220.

In some examples, the XOR gate 310 receives at its inputs the input 222 to the loop break element 220 and the output 224 of the loop break element 220. The XOR gate 310 is configured to detect a change in state between the input and output of the combinational loop path, such as the loop break element 220. The output 312 of the XOR gate 310 is provided to a first input of the AND gate 320. In addition, the AND gate 320 receives at a second input a signal representing the consumer type of the output 224. In this case, the second input of the AND gate 320 receives write enable signal indicating that the consumer type is the memory write element. In this way, whenever a state change is detected by the XOR gate 310 (e.g., the input 222 differs in value from the output 224) and the write enable signal is in the enabled state causing the memory write element to write data, the combinational loop emulation operation 108 doubles or otherwise increases the rate of the clock applied to the loop break element 220. In such cases, the clock applied to the loop break element 220 is faster relative to the rate of the clock applied to other circuit elements to add at least one extra clock cycle to the loop break element 220 before a rising or falling edge of the fclk is applied to the other circuit elements. In some cases, when the consumer type is a memory read element, the output of the AND gate 320 remains false, which prevents the application of a faster clock signal to the loop break element 220.

In some examples, as shown in example 301 of FIG. 3B, the consumer type that receives the output of the loop break element 220 is a falling edge triggered flip flop element 331. In such cases, the combinational loop emulation operation 108 can add logic elements including an XOR gate 310 and an AND (or NAND) gate 320 to selectively control the clock frequency and whether extra clock cycles are applied to the loop break element 220 before the signal is propagated and processed by the falling edge triggered flip flop element 331. Particularly, in the case that the consumer type is the falling edge triggered flip flop element 331, the combinational loop emulation operation 108 can continue operating the loop break element 220 at the frequency of the fclk when or in response to detecting a change in state between the input 222 to the loop break element 220 and the output 224 of the loop break element 220. This is because the falling edge triggered flip flop element 331 is triggered at the falling edge of the fclk. This provides sufficient time for the signal to propagate through the loop break element 220 on the rising edge of the fclk and be provided to the input of the falling edge triggered flip flop element 331. The output 224 can be processed by the falling edge triggered flip flop element 331 on the next falling edge of the fclk after having been latched, stored, or processed on the previous rising edge by the loop break element 220.

In some examples, the XOR gate 310 receives at its inputs the input 222 to the loop break element 220 and the output 224 of the loop break element 220. The XOR gate 310 is configured to detect a change in state between the input and output of the combinational loop path, such as the loop break element 220. The output 312 of the XOR gate 310 is provided to a first input of the AND gate 320. In addition, the AND gate 320 receives at a second input a signal representing the consumer type of the output 224. In this case, the second input of the AND gate 320 receives the user clock 333 (e.g., the fclk) indicating that the consumer type is the falling edge triggered flip flop element 331. In this way, whenever a state change is detected by the XOR gate 310 (e.g., the input 222 differs in value from the output 224) and the user clock 333 is in the enabled state (rising edge), the combinational loop emulation operation 108 doubles or otherwise increases the rate of the clock applied to the loop break element 220. Otherwise, the loop break element continues operating at the normal fclk rate.

As shown in FIG. 4, the consumer type that receives the output of the loop break element 220 is a flip-flop element 410. In such cases, the combinational loop emulation operation 108 can prevent operating the loop break element 220 at a faster clock and continue operating the loop break element 220 at the fclk applied to the remaining circuit elements. For example, the combinational loop emulation operation 108 can detect in the original circuit design 400 the loop break element 220, a set of logic elements 420, and the flip-flop element 410. Rather than running the loop break element 220 at a faster clock, the combinational loop emulation operation 108 can duplicate the logic elements 420 to create another instance 430 of the logic elements 420, as shown in the transformed circuit 401. The combinational loop emulation operation 108 can create a signal that bypasses the loop break element 220 and is routed through the instance 430 directly to the flip-flop element 410. In this way, whenever the flip-flop element 410 is clocked by the fclk, the change in state, if any, is already present at the input to the flip-flop element 410.

Other circuit elements (e.g., other fanouts) can receive the output of the logic elements 420. If any of the other circuit elements that receive the output of the logic elements 420 include consumer types that cannot have delayed inputs relative to the input to the loop break element 220, the combinational loop emulation operation 108 can determine to operate the loop break element 220 at a faster rate, as discussed above in example 300.

Figure 5:
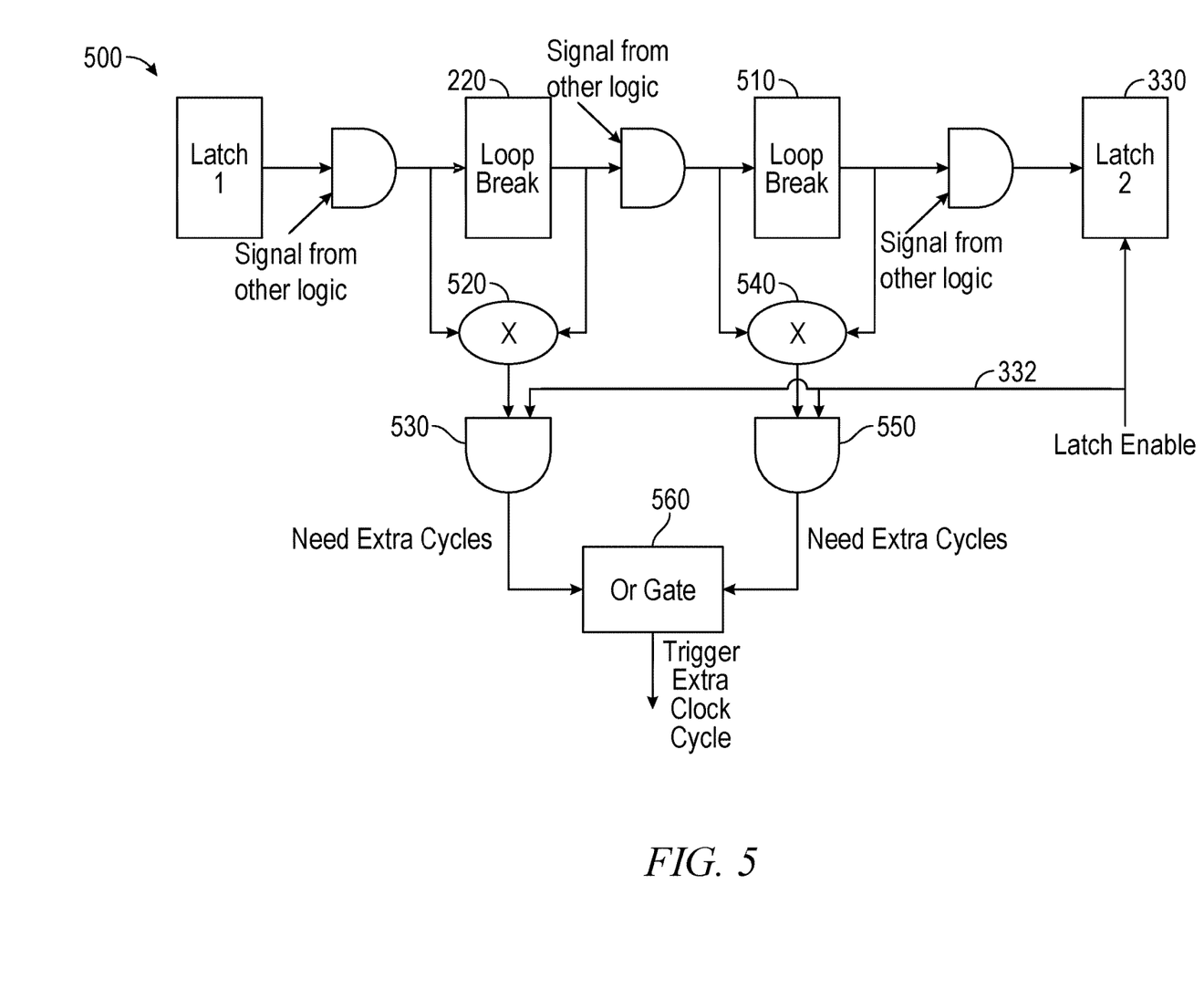
FIG. 5 illustrates an example of emulating multiple combinational loop paths, in accordance with some embodiments of the present disclosure.

FIG. 5 illustrates an example of emulating multiple combinational loop paths 500, in accordance with some embodiments of the present disclosure. As shown in FIG. 5, the multiple combinational loop paths 500 include a first loop break element 220, a second loop break element 510, and a latch 330. Particularly, the combinational loop emulation operation 108 may have detected multiple combinational loops, in which case the combinational loop emulation operation 108 may detect and/or insert two loop break elements 220 and 510. In order to avoid running the loop break element 220 and the second loop break element 510 constantly at four times the fclk, and to ensure that the signal output by the second loop break element 510 represents the correct or current state present at the input to the loop break element 220, the combinational loop emulation operation 108 can selectively enable faster clocks or extra clock cycles, as discussed above.

In some examples, the combinational loop emulation operation 108 can add a first XOR gate 520, a first AND (or NAND) gate 530, a second XOR gate 540, a second AND (or NAND) gate 550, and an OR gate 560 in the signal path. This collection of logic elements can determine whether a plurality of conditions is satisfied to enable or trigger the application of faster fclks being applied to the loop break element 220 and the second loop break element 510. Specifically, the first XOR gate 520 can receive at its inputs the input to the loop break element 220 and the output of the loop break element 220 which enables the combinational loop emulation operation 108 to detect a change in state between the input and output of the loop break element 220. This change in state information is provided to the gate 530, which also evaluates whether a consumer of the output of the loop break element 220 (e.g., the latch 330) is of a type that needs the signal output by the loop break element 220 to be current. Namely, the gate 530 receives at its inputs the output of the first XOR gate 520 and the latch enable signal 332.

Similarly, the second XOR gate 540 can receive at its inputs the input to the loop break element 510 and the output of the loop break element 510. The second XOR gate 540 can detect a change in state between the input and output of the loop break element 510. This change in state information is provided to the AND gate 550, which also evaluates whether a consumer of the output of the loop break element 220 (e.g., the latch 330) is of a type that needs the signal output by the loop break element 510 to be current. Namely, the AND gate 550 receives at its inputs the output of the second XOR gate 540 and the latch enable signal 332.

When any one of the outputs of the gate 530 or the gate 550 are true, this indicates that the fclk applied to the loop break element 220 and the second loop break element 510 needs to be faster or that an extra cycle is needed. To trigger the application of the faster fclk, the combinational loop emulation operation 108 can apply the outputs of the gate 530 and the gate 550 to the OR (or NOR) gate 560. The output of the OR gate 560, when true, triggers the application of the faster clocks to both the loop break element 220 and the second loop break element 510 until the output of the gate 560 changes.

Figure 6:
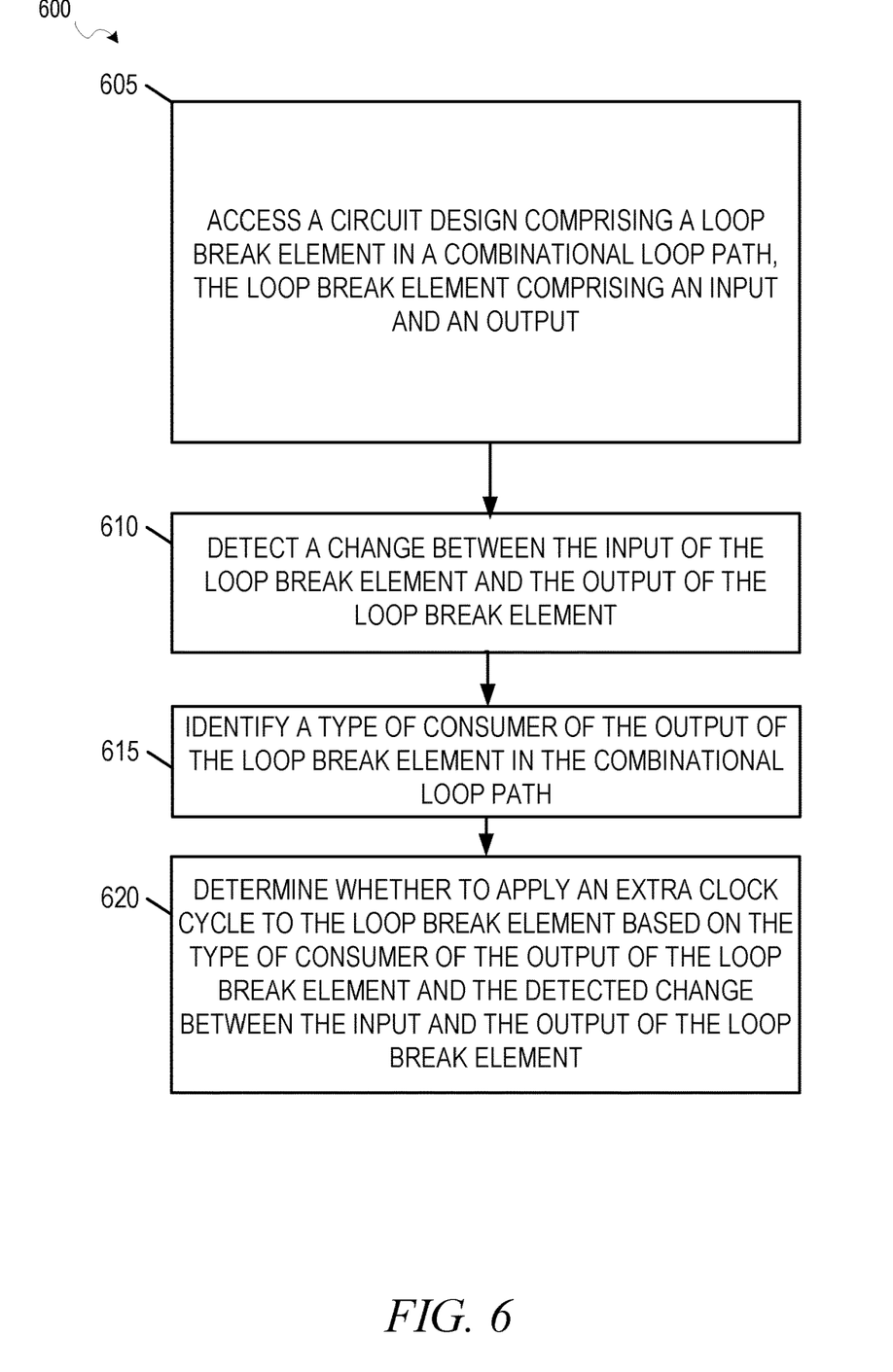
FIG. 6 illustrates an example process for emulating a combinational loop path, in accordance with some embodiments of the present disclosure.

FIG. 6 illustrates a process 600 for performing combinational loop emulation, according to some embodiments of the present disclosure. The process 600 begins with operation 605 in which a circuit design (e.g., integrated circuit design) stored in memory is accessed. This circuit design includes a loop break element in a combinational loop path. The loop break element includes an input and an output. At operation 610, a change between the input and the output of the loop break element is detected, and, at operation 615, a type of consumer of the output of the loop break element in the combinational loop path is identified. At operation 620, a determination is made as to whether to apply an extra clock cycle to the loop break element based on the type of consumer of the output of the loop break element and the detected change between the input and the output of the loop break element.

Figure 7:
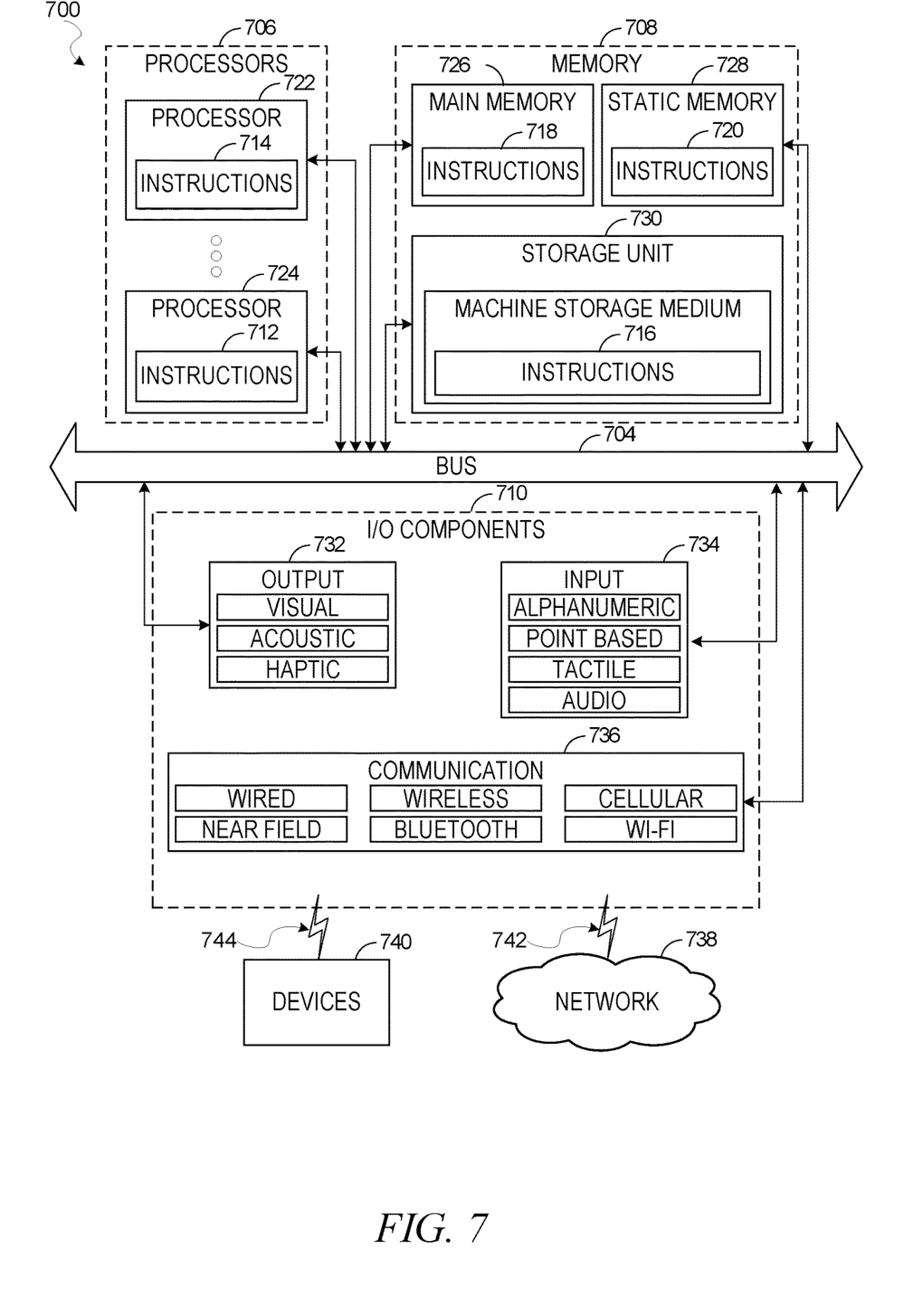
FIG. 7 is a functional block diagram of an example computing system for carrying out methods and operations described herein, in accordance with some embodiments of the present disclosure.

FIG. 7 is a functional block diagram of a computing system 700 for executing process 600 and other processes described above, along with other embodiments of the present disclosure. The computing system 700 may execute an EDA software system and for performing the process 600, and other processes described above, in accordance with some embodiments of the present disclosure. A machine is shown in the form of a computing system 700 within which a set of instructions may be executed for causing the machine to perform any one or more of the process 600 and other methodologies discussed herein, according to some embodiments. Specifically, FIG. 7 shows a diagrammatic representation of the machine in the example form of a computing system 700. The computing system 700 may include a bus 704, processors 706, memory 708, and I/O components 710, which may be configured to communicate with each other such as via the bus 704. The machine may include instructions 712-720 (e.g., software, a program, an application, an applet, an app, or other executable code) for causing the machine to perform any one or more of the methodologies discussed herein may be executed. For example, the instructions 712-720 may cause the machine to execute an EDA software system that executes the above processes described in the above description. The instructions 712-720 transform the general, non-programmed machine into a particular machine programmed to carry out the described and illustrated functions in the manner described here. In alternative embodiments, the machine operates as a standalone device or may be coupled (e.g., networked) to other machines. In a networked deployment, the machine may operate in the capacity of a server machine or a client machine in a server-client network environment, or as a peer machine in a peer-to-peer (or distributed) network environment. The machine may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 712-720, sequentially or otherwise, that specify actions to be taken by the machine. Further, while only a single machine is illustrated, the term "machine" shall also be taken to include a collection of machines that individually or jointly execute the instructions 712-720 to perform any one or more of the methodologies discussed herein.

In an example embodiment, the processors 706 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 722 and a processor 724 that may execute the instructions 714, 712. The term "processor" is intended to include multi-core processors 706 that may comprise two or more independent processors (sometimes referred to as "cores") that may execute instructions contemporaneously. Although FIG. 7 shows multiple processors 706, the machine may include a single processor with a single core, a single processor with multiple cores (e.g., a multi-core processor), multiple processors with a single core, multiple processors with multiple cores, or any combination thereof.

The memory 708 may include a main memory 726, a static memory 728, and a storage unit 730, both accessible to the processors 706 such as via the bus 704. The main memory 726, the static memory 728, and the storage unit 730 store the instructions 716-720 embodying any one or more of the processes, methodologies or functions described herein. The instructions 712-820 may also reside, completely or partially, within the main memory 726, within the static memory 728, within the storage unit 730, within at least one of the processors 706 (e.g., within the processor's cache memory), or any suitable combination thereof, during execution thereof by the machine.

The I/O components 710 may include a wide variety of components to receive input, provide output, produce output, transmit information, exchange information, capture measurements, and so on. The specific I/O components 710 that are included in a particular machine will depend on the type of machine. For example, portable machines such as mobile phones will likely include a touch input device or other such input mechanisms, while a headless server machine will likely not include such a touch input device. It will be appreciated that the I/O components 710 may include many other components that are not shown in FIG. 7. The I/O components 710 are grouped according to functionality merely for simplifying the following discussion and the grouping is in no way limiting. In various example embodiments, the I/O components 710 may include output components 732 and input components 734. The output components 732 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 734 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 710 may include communication components 736 operable to couple the machine to a network 738 or devices 740 via a coupling 742 and a coupling 744, respectively. For example, the communication components 736 may include a network interface component or another suitable device to interface with the network 738. In further examples, the communication components 736 may include wired communication components, wireless communication components, cellular communication components, and other communication components to provide communication via other modalities. The devices 740 may be another machine or any of a wide variety of peripheral devices (e.g., a peripheral device coupled via a universal serial bus (USB)).

Executable Instructions and Machine Storage Medium

The various memories (e.g., 708, 726, 728 and/or memory of the processor(s) 706, 722, 724) and/or the storage unit 730 may store one or more sets of instructions and data structures (e.g., software) embodying or utilized by any one or more of the methodologies or functions described herein. These instructions, when executed by the processor(s) 706, cause various operations to implement the disclosed embodiments.

As used herein, the terms "machine-storage medium," "device-storage medium," and "non-transitory computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 738 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 738 or a portion of the network 738 may include a wireless or cellular network, and the coupling 742 may be a Code Division Multiple Access (CDMA) connection, a Global System for Mobile communications (GSM) connection, or another type of cellular or wireless coupling. In this example, the coupling 742 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 712-720 may be transmitted or received over the network 738 using a transmission medium via a network interface device (e.g., a network interface component included in the communication components 736) and utilizing any one of a number of well-known transfer protocols (e.g., hypertext transfer protocol (HTTP)). Similarly, the instructions 712-720 may be transmitted or received using a transmission medium via the coupling 744 (e.g., a peer-to-peer coupling) to the devices 740. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 712-720 for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media (non-transitory computer readable media or medium) and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
    accessing a circuit design that comprises a first loop break element in a first combinational loop path, the first loop break element comprising an input and an output;
    detecting a change between the input of the first loop break element and the output of the first loop break element;
    identifying a type of consumer of the output of the first loop break element in the first combinational loop path;
    identifying a second loop break element in a second combinational loop path of the circuit design, the second loop break element comprising an input and an output; and
    determining whether to apply an extra clock cycle to the first loop break element and the second loop break element based on a first condition comprising the type of consumer of the output of the first loop break element and the detected change between the input and the output of the first loop break element, and a second condition comprising a type of consumer of the output of the second loop break element and a detected change between the input and the output of the second loop break element.

2. The method of claim 1, wherein the first loop break element comprises a first flip flop, and wherein the type of consumer comprises a second flip flop that is triggered on a falling edge of a clock, further comprising maintaining a clock frequency of the clock that is applied to the first loop break element to prevent application of the extra clock cycle in response to determining that the type of consumer comprises the second flip flop.

3. The method of claim 1, comprising:
in response to detecting the change between the input and the output of the first loop break element and in response to determining that the type of consumer comprises a first type of element that is asynchronous, increasing a clock frequency of a clock that is applied to the first loop break element to generate the extra clock cycle.

4. The method of claim 3, comprising:
in response to detecting the change between the input and the output of the first loop break element and in response to determining that the type of consumer comprises a second type of element that is synchronous, maintaining a clock frequency of a clock that is applied to the first loop break element to prevent application of the extra clock cycle.

5. The method of claim 1, comprising:
identifying one or more circuit elements between the first loop break element and the consumer; and
in response to determining that the type of consumer comprises a flip flop:
duplicating the one or more circuit elements; and
bypassing the first loop break element to route the input of the first loop break element to the consumer via the duplicated one or more circuit element.

6. The method of claim 1, comprising:
applying the input and the output of the first loop break element to an XOR gate;
applying an output of the XOR gate to a first input of an AND gate; and
applying a signal associated with the consumer of the output of the first loop break element to a second input of the AND gate.

7. The method of claim 6, comprising:
triggering application of the extra clock cycle to the first loop break element based on an output of the AND gate.

8. The method of claim 6, wherein the consumer type comprises a latch, and wherein the signal associated with the consumer comprises a latch enable signal.

9. The method of claim 6, wherein the consumer type comprises a memory write element, and wherein the signal associated with the consumer comprises a write enable signal.

10. The method of claim 1, wherein the type of consumer comprises at least one of a latch, a flip flop, a memory write element, or a memory read element.

11. The method of claim 1, comprising:
generating the extra clock cycle in response to determining whether to apply the extra clock cycle to the first loop break element.

12. The method of claim 1, comprising:
detecting the change between the input of the second loop break element and the output of the second loop break element;
identifying the type of consumer of the output of the second loop break element in the second combinational loop path; and.

13. The method of claim 12, wherein the extra clock cycle is applied to both the first and second loop break elements in response to either of the first or second conditions being satisfied.

14. The method of claim 12, comprising:
applying the input and the output of the first loop break element to a first XOR gate;
applying an output of the first XOR gate to a first input of a first AND gate;
applying a signal associated with the consumer of the output of the first loop break element to a second input of the first AND gate;
applying the input and the output of the second loop break element to a second XOR gate;
applying an output of the second XOR gate to a first input of a second AND gate;
applying a signal associated with the consumer of the output of the second loop break element to a second input of the second AND gate; and
applying outputs of the first and second AND gates to an OR gate.

15. The method of claim 14, comprising:
triggering application of the extra clock cycle to the first and second loop break elements based on an output of the OR gate.

16. A non-transitory computer-readable medium comprising instructions, that when executed by a processor, configure the processor to perform operations comprising:
accessing a circuit design that comprises a first loop break element in a first combinational loop path, the first loop break element comprising an input and an output;
detecting a change between the input of the first loop break element and the output of the first loop break element;
identifying a type of consumer of the output of the first loop break element in the first combinational loop path;
identifying a second loop break element in a second combinational loop path of the circuit design, the second loop break element comprising an input and an output; and
determining whether to apply an extra clock cycle to the first loop break element and the second loop break element based on a first condition comprising the type of consumer of the output of the first loop break element and the detected change between the input and the output of the first loop break element, and a second condition comprising a type of consumer of the output of the second loop break element and a detected change between the input and the output of the second loop break element.

17. The non-transitory computer-readable medium of claim 16, wherein the first loop break element comprises a flip flop.

18. The non-transitory computer-readable medium of claim 16, wherein the operations comprise:
in response to detecting the change between the input and the output of the first loop break element and in response to determining that the type of consumer comprises a first type, increasing a clock frequency of a clock that is applied to the first loop break element to generate the extra clock cycle.

19. The non-transitory computer-readable medium of claim 18, wherein the operations comprise:
in response to detecting the change between the input and the output of the first loop break element and in response to determining that the type of consumer comprises a second type, maintaining a clock frequency of a clock that is applied to the first loop break element to prevent application of the extra clock cycle.

20. A system comprising:

one or more processors; and a memory storing instructions that, when executed by the one or more processors, cause the system to perform operations comprising:

accessing a circuit design that comprises a first loop break element in a first combinational loop path, the first loop break element comprising an input and an output;

detecting a change between the input of the first loop break element and the output of the first loop break element;

identifying a type of consumer of the output of the first loop break element in the first combinational loop path;

identifying a second loop break element in a second combinational loop path of the circuit design, the second loop break element comprising an input and an output; and determining whether to apply an extra clock cycle to the first loop break element and the second loop break element based on a first condition comprising the type of consumer of the output of the first loop break element and the detected change between the input and the output of the first loop break element, and a second condition comprising a type of consumer of the output of the second loop break element and a detected change between the input and the output of the second loop break element.

* * * * *